United States Patent [19]

Weber et al.

[11] Patent Number: 5,631,333

[45] Date of Patent: May 20, 1997

[54] BLENDS BASED ON COPOLYARYLENE ETHER SULFONES

[75] Inventors: Martin Weber, Neustadt; Gerhard Leiter, Weinheim; Jürgen Streib, Worms, all of Germany; Eckhard M. Koch, Kuwana, Japan

[73] Assignee: BASF Aktiengesellschaft, Ludwigshafen, Germany

[21] Appl. No.: 370,609

[22] Filed: Jan. 10, 1995

[30] Foreign Application Priority Data

Jan. 13, 1994 [DE] Germany .................. 44 00 747.7

[51] Int. Cl.$^6$ .................. C08G 75/00; C08G 75/14
[52] U.S. Cl. .................. 525/535; 525/534; 525/537; 528/97; 528/98; 528/99; 528/125; 528/172; 528/175
[58] Field of Search .................. 528/420, 97, 98, 528/99, 125, 172, 175; 525/537, 390, 534, 535, 538

[56] References Cited

U.S. PATENT DOCUMENTS

| | | | |
|---|---|---|---|
| 5,126,427 | 6/1992 | Pfaendner et al. | 528/128 |
| 5,134,207 | 7/1992 | McGrath | 525/537 |
| 5,212,264 | 5/1993 | Hoffmann et al. | 525/534 |

Primary Examiner—Shelley A. Dodson
Attorney, Agent, or Firm—Keil & Weinkauf

[57] ABSTRACT

Blends comprise

A) from 55 to 99% by weight of a matrix of copolyarylene ether sulfones composed of
  $a_1$) from 91 to 97 mol % of structural units

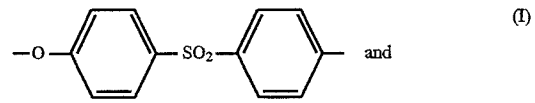

$a_2$) from 3 to 9 mol % of structural units

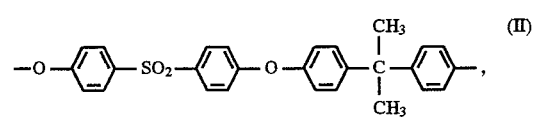

B) from 1 to 45% by weight of a disperse phase comprising copolyarylene ether sulfones, composed of
  $b_1$) from 91 to 97 mol % of structural units II and
  $b_2$) from 3 to 9 mol % of structural units I,
C) from 0 to 40% by weight of rubber impact modifiers,
D) from 0 to 60% by weight of fibrous or particulate fillers or of mixtures thereof and
E) from 0 to 40% by weight of processing assistants and/or additives.

6 Claims, No Drawings

BLENDS BASED ON COPOLYARYLENE ETHER SULFONES

The present invention relates to blends comprising

A) from 55 to 99% by weight of a matrix of copolyarylene ether sulfones composed of a$_1$) from 91 to 97 mol % of structural units

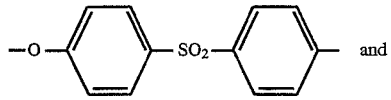

a$_2$) from 3 to 9 mol % of structural units

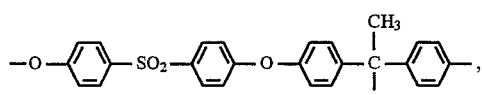

B) from 1 to 45% by weight of a disperse phase comprising copolyarylene ether sulfones, composed of b$_1$) from 91 to 97 mol % of structural units II and
b$_2$) from 3 to 9 mol % of structural units I, C) from 0 to 40% by weight of rubber impact modifiers,
D) from 0 to 60% by weight of fibrous or particulate fillers or of a mixture thereof and
E) from 0 to 40% by weight of processing assistants and/or additives.

The present invention furthermore relates to a process for the preparation of these blends and to the use thereof.

Blends of different polyarylene ether sulfones are known. For example, EP-B1-215 580 describes miscible, i.e. monophase blends comprising two or more polyarylene ether sulfones which contain, as repeating units,

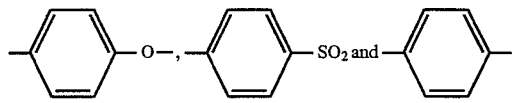

and which differ from one another with respect to the composition of the units. These blends are particularly suitable for the production of circuit boards.

DE-A1-29 17 903 disclosed compositions for the production of semipermeable membranes, which are obtained by mixing two pulverulent polyarylene ether sulfones, one of which essentially consists of structural units I and the other essentially consists of structural units II.

Cooking utensils consisting of a blend of polyarylene ether sulfones having repeating units

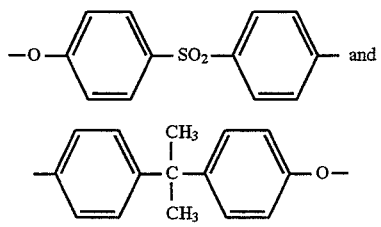

and those which contain structural units I and II were disclosed in EP-B1-127 852.

DE-A1-37 19 631 describes transparent molding materials which comprise blends of from 1 to 20% by weight of the copolyarylene ether sulfones A and from 80 to 99% by weight of the copolyarylene ether sulfones B.

The known blends based on polyarylene ether sulfones do not meet the high requirements set in particular for materials used in the food sector. The high moisture absorption of the polyarylene ether sulfones continues to present a problem. At elevated temperatures, the water absorbed diffuses out of the moldings, resulting in the formation of blisters at the surfaces thereof. The high melt viscosity of the known materials also gives rise to difficulties. In particular, this makes the production of large moldings, such as bowls and compartmentalized food trays, more difficult. In addition, the resistance of the known blends to chemicals (for example from foods or detergents) is still unsatisfactory.

It is an object of the present invention to provide novel molding materials based on polyarylene ether sulfones, which can be readily processed and also exhibit low water absorption and good resistance to chemicals. We have found that this object is achieved by the blends defined at the outset.

The novel blends consist essentially of two phases, a matrix comprising the copolyarylene ether sulfones A (matrix polymers) and a disperse phase comprising the copolyarylene ether sulfones B (dispersed polymers). The matrix polymers A account for from 55 to 99% by weight of the blends. Preferred blends contain from 58 to 97, in particular from 60 to 97%, by weight of matrix polymers A. Accordingly, the polymers B dispersed in the matrix polymers are present in the novel blends in an amount of from 1 to 45, preferably from 3 to 42%, by weight. The amount of the dispersed polymers B in the novel blends is in particular from 5 to 40% by weight.

The copolyarylene ether sulfones A and B can be prepared, for example, by subjecting mixtures of 2,2-di-(4-hydroxyphenyl)propane (bisphenol A) and 4,4'-dihydroxydiphenyl sulfone (bisphenol S) to a condensation reaction with 4,4'-dichlorodiphenyl sulfone. Corresponding reaction conditions are familiar to persons skilled in the art and are described in, for example, U.S. Pat. No. 4,175,175, EP-A1-113 112 and EP-A1-135 130.

Component C

In addition to the components A and B, the novel blends may contain from 0 to 40, preferably from 1 to 20%, by weight of rubber impact modifiers. Those capable of toughening polyarylene ethers are particularly suitable.

Examples of rubbers which increase the toughness of the blends are:

EP and EPDM rubbers which have been grafted with functional groups. Suitable grafting reagents are, for example, maleic anhydride, itaconic acid, acrylic acid, glycidyl acrylate and glycidyl methacrylate.

These monomers may be grafted onto the polymer in the melt or in solution, in the presence or absence of a free radical initiator, such as cumyl hydroperoxide.

Further examples are copolymers of α-olefins. The α-olefins are usually monomers of 2 to 8 carbon atoms, preferably ethylene and propylene. Alkyl acrylates or alkyl methacrylates which are derived from alcohols of from 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable as comonomers. Mixtures of different comonomers may also be used. Copolymers of ethylene with ethyl or butyl acrylate and acrylic acid and/or maleic anhydride have proven particularly suitable.

The copolymers can be prepared by a high-pressure process at from 400 to 4500 bar or by grafting the comonomers onto the poly-α-olefin. The amount of α-olefin in the copolymer is in general from 99.95 to 55% by weight.

A further group of suitable elastomers comprises core/shell graft rubbers. These are graft rubbers prepared in emulsion and consisting of at least one hard and one soft component. A hard component is usually understood as meaning a polymer having a glass transition temperature of at least 25° C., while a soft component is usually understood as meaning a polymer having a glass transition temperature of not more than 0° C. These products have a structure comprising a core and at least one shell, the structure being determined by the order of addition of the monomers. The soft components are derived in general from butadiene, isoprene, alkyl acrylates, alkyl methacrylates or siloxanes and, if required, further comonomers. Suitable siloxane cores can be prepared, for example, starting from cyclic oligomeric octamethyltetrasiloxane or tetravinyltetramethyltetrasiloxane. These can be reacted, for example, with γ-mercaptopropylmethyldimethoxysilane in a ring-opening cationic polymerization, preferably in the presence of sulfonic acids, to give the soft siloxane cores. The siloxanes can also be crosslinked, for example by carrying out the polymerization reaction in the presence of silanes having hydrolyzable groups, such as halogen or alkoxy groups, e.g. tetraethoxysilane, methyltrimethoxysilane or phenyltrimethoxysilane. Examples of suitable comonomers here are styrene, acrylonitrile and cross-linking or graft-linking monomers having more than one polymerizable double bond, such as divinyl phthalate, divinylbenzene, butanediol diacrylate or triallyl (iso)cyanurate. The hard components are derived in general from styrene, α-methylstyrene and copolymers thereof, preferred comonomers here being acrylonitrile, methacrylonitrile and methyl methacrylate.

Preferred core/shell graft rubbers contain a soft core and a hard shell or a hard core, a first soft shell and at least one further hard shell. Functional groups such as carbonyl, carboxyl, anhydride, amido, imido, carboxylate, amino, hydroxyl, epoxy, oxazoline, urethane, urea, lactam or halobenzyl groups are preferably incorporated by adding suitable functionalized monomers during the polymerization of the final shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15%, by weight, based on the total weight of the core/shell graft rubber. The weight ratio of soft to hard components is in general from 1:9 to 9:1, preferably from 3:7 to 8:2.

Such rubbers are known per se and are described, for example, in EP-A 208 187.

A further group of suitable impact modifiers are thermoplastic polyester elastomers. Polyester elastomers are understood as meaning segmented copolyetheresters which contain long-chain segments which as a rule are derived from poly(alkylene) ethers glycols and short-chain segments which are derived from low molecular weight diols and dicarboxylic acids. Such products are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Mixtures of different rubbers can of course also be used.

Component D

In addition to the stated components, the novel blends may contain up to 60, preferably from 0 to 35%, by weight of fibrous or particulate fillers or mixtures thereof.

Preferred fibrous fillers or reinforcing materials are carbon fibers, potassium titanate whiskers, aramid fibers and particularly preferably glass fibers. Where glass fibers are used, they may be provided with a size and an adhesion promoter in order to improve the compatibility with the matrix material. In general, the carbon fibers and glass fibers used have a diameter of from 6 to 20 μm.

The glass fibers may be incorporated both in the form of short glass fibers and in the form of rovings. In the finished injection molded part, the average length of the glass fibers is preferably from 0.06 to 0.5 mm.

Carbon fibers or glass fibers may also be used in the form of woven fabrics, mats or rovings.

Suitable particulate fillers are amorphous silica, magnesium carbonate (chalk), powdered quartz, mica, talc, feldspar, glass beads and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite. Blends containing from 1 to 6% by weight of carbon black, from 5 to 25% by weight of wollastonite and from 0 to 15% by weight of carbon fibers are also of interest.

Component E

In addition to the components A to D described, the novel blends may also contain from 0 to 40% by weight of processing assistants and/or additives, such as flameproofing agents, pigments or stabilizers.

The novel blends can be prepared by mixing the components in the melt and extruding the product.

The novel blends can be prepared, for example, by mixing the starting components in a conventional mixing apparatus, such as a screw extruder, preferably a twin-screw extruder, a Brabender mill or a Banbury mill, or a kneader and then extruding the mixture. After extrusion, the extrudate is cooled and comminuted.

The order in which the components are mixed may be varied; thus, two or, if necessary, three components can be premixed, or all components may be mixed together.

Thorough mixing is advantageous for obtaining very homogeneous blends. Average mixing times of from 0.2 to 20 minutes at from 280° to 400° C. are generally required for this purpose.

The novel blends can be processed by a thermoplastic method. They exhibit good flow and low water absorption and are suitable for the production of films, fibers, coatings and moldings. The novel blends are particularly suitable for the production of household appliances, such as cooking utensils, or apparatuses for the medical sector.

EXAMPLES

The dried granules were processed at from 330° to 360° C. to give standard small bars, circular disks and test boxes. The heat distortion resistance of the samples was evaluated by means of the Vicat softening temperature. The latter was determined with standard small bars, according to DIN 53 460, at a force of 49.05N and a temperature increase of 50K per hour.

The flow of the blends was determined according to DIN 53 735 at 320° C. and a load of 21.6 kg. The water absorption of the blends was determined using test boxes having a wall thickness of 1.5 mm, after storage in water for 14 days at 25° C. The temperature at which blister formation due to emerging water occurred ($T_B$) was determined by the following test:

After storage in water for 14 days, the test boxes were stored in a preheated through-circulation oven for 30 minutes and then assessed visually. The temperature at which blisters first occurred was determined.

The resistance to chemicals was assessed by means of the bending strip method according to DIN 53 449, Part 3. The storage time was 24 hours in each case, and the temperature of the test media (3% strength by weight acetic acid) was 96° C.

The damaging energy $W_s$ was tested using circular disks according to DIN 53 443. The impact strength $a_k$ was determined according to Charpy (DIN 53 353).

The composition of the blends and the results of the application tests are shown in Tables 1 and 2.

Component $A_1$

Copolyarylene ether containing 95 mol % of structural units I and 5 mol % of structural units II (viscosity number= 59 ml/g, measured in 1% strength by weight solution in a mixture of phenol and 1,2-dichlorobenzene in a ratio of 1:1 at 23° C., e.g. commercial product Ultrason® E 2010, BASF).

Component $\alpha_1$

Polyarylene ether containing 100 mol % of structural units I (viscosity number=56 ml/g, measured in 1% strength by weight solution in a mixture of phenol and 1,2-dichlorobenzene in a ratio of 1:1 at 23° C.).

Component $\alpha_2$

Copolyarylene ether containing 63.5 mol % of structural units I and 36.5 mol % of structural units II (viscosity number=57 ml/g, measured in 1% strength by weight solution in a mixture of phenol and 1,2-dichlorobenzene in a ratio of 1:1 at 23° C.).

Component $B_1$

Copolyarylene ether containing 95 mol % of structural units II and 5 mol % of structural units I (viscosity number= 64 ml/g, measured in 1% strength by weight solution in a mixture of phenol and 1,2-dichlorobenzene in a ratio of 1:1 at 23° C., e.g. commercial product Ultrason® S 2010).

Component $\beta_1$

Polyarylene ether containing 100 mol % of structural units II (viscosity number=65 ml/g, measured in 1% strength by weight solution in a mixture of phenol and 1,2-dichlorobenzene in a ratio of 1:1 at 23° C.).

Examples 1 and 2 and Comparative Examples V1 to V6

The components were mixed in a twin-screw extruder at a melt temperature of from 320° to 380° C. The melt was passed through a water bath and granulated.

TABLE 1

| Blend No. | 1 | 2 | V1 | V2 | V3 | V4 | V5 | V6 |
|---|---|---|---|---|---|---|---|---|
| Component [% by weight] | | | | | | | | |
| $A_1$ | 80 | 65 | 50 | 100 | — | 65 | — | — |
| $\alpha_1$ | — | — | — | — | — | — | 65 | — |
| $\alpha_2$ | — | — | — | — | — | — | — | 100 |
| $B_1$ | 20 | 35 | 50 | — | 100 | — | 35 | — |
| $\beta_1$ | — | — | — | — | — | 35 | — | — |
| Properties | | | | | | | | |
| Vicat B [°C.] | 213 | 207 | 191 | 215 | 184 | 205 | 207 | 204 |
| MVI [ml/10 min] | 81 | 98 | 108 | 61 | 128 | 92 | 94 | 79 |
| Water absorption [% by weight] | 1.7 | 1.5 | 1.4 | 2.1 | 0.8 | 1.5 | 1.8 | 1.5 |
| $T_B$ | 200 | 195 | 180 | 200 | 180 | 190 | 190 | 195 |
| Extreme fiber elongation [%] | 0.75 | 0.75 | 0.75 | 0.2 | 0.5 | 0.5 | 0.5 | 0.2 |

V: Comparative experiments

Compared with the individual components, the novel blends have improved flow and, surprisingly, improved resistance to chemicals (V2 and V3). Blends of the copolyarylene ether sulfones $A_1$ and $B_1$ which do not have the novel composition are inferior to the novel blends with regard to the temperature at which blister formation occurs (cf. V1).

Compared with blends of polyarylene ethers which consist of in each case 100 mol % of structural units I (V4) or II (V5), the novel blends have improved heat distortion resistance and resistance to chemicals. This also applies to copolyarylene ether sulfones which are composed of the structural units I and II and in which the molar ratio of I to II is comparable with that of the blends (V6).

Example 3

65% by weight of component $A_1$ and 35% by weight of component $B_1$ were mixed in the melt as described above and the mixture was granulated. The granules were then processed at a plastics temperature of 350° C. and a mold surface temperature of 120° C. to give standard small bars and circular disks.

Comparative Example V7

65% by weight of powder of Component $A_1$ and 35% by weight of powder of component $B_1$ were mixed in an impeller mixer and the mixture was then processed at a plastics temperature of 350° C. and a mold temperature of 120° C. to give standard small bars and circular disks.

TABLE 2

| Blend No. | 3 | V7 |
|---|---|---|
| Component [% by weight] | | |
| $A_1$ | 65 | 65 |
| $B_1$ | 35 | 35 |
| Properties | | |
| Vicat B [°C.] | 207 | 199 |
| $W_s$ [Nm] | 98 | 77 |
| $a_k$ [kJ/m$^2$] | 7 | 4.6 |

As the experiments show, moldings comprising blends which were prepared by the novel process have better mechanical properties than those obtained from powder mixtures.

We claim:

1. A blend of polyarylene ether sulfones comprising

A) from 55 to 99% by weight of a matrix of copolyarylene ether sulfones composed of $a_1$) from 91 to 97 mol % of structural units

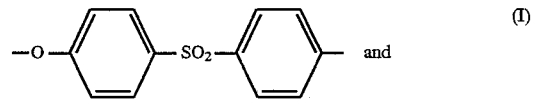 and (I)

$a_2$) from 3 to 9 mol % of structural units

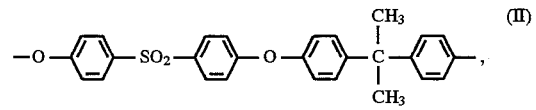 (II)

B) from 1 to 45% by weight of a disperse phase comprising copolyarylene ether sulfones, composed of
   $b_1$) from 91 to 97 mol % of structural units II and
   $b_2$) from 3 to 9 mol % of structural units I, and
C) from 0 to 40% by weight of rubber impact modifiers.

2. A blend as defined in claim 1, comprising
A) from 60 to 95% by weight of copolyarylene ether sulfones A,
B) from 5 to 40% by weight of copolyarylene ether sulfones B, and
C) from 0 to 40% by weight of rubber impact modifiers.

3. A blend as defined in claim 1, comprising
A) from 55 to 98% by weight of copolyarylene ether sulfones A,
B) from 1 to 44% by weight of copolyarylene ether sulfones B, and
C) from 1 to 20% by weight of rubber impact modifiers.

4. A process for the preparation of a blend comprising mixing in the melt
A) from 55 to 99% by weight of a matrix of copolyarylene ether sulfones composed of
   $a_1$) from 91 to 97 mol % of structural units

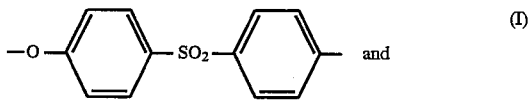

$a_2$) from 3 to 9 mol % of structural units

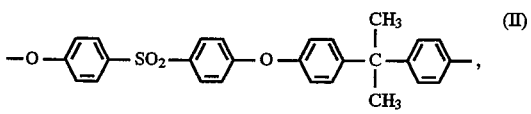

B) from 1 to 45% by weight of a disperse phase comprising copolyarylene ether sulfones, composed of
   $b_1$) from 91 to 97 mol % of structural units II and
   $b_2$) from 3 to 9 mol % of structural units I, and
C) from 0 to 40% by weight of rubber impact modifiers.

5. A fiber, film coating or molding containing a blend as defined in claim 1.

6. A cooking utensil containing a blend as defined in claim 1.

* * * * *